United States Patent
Geniesse (10) Patent No.: US 7,045,104 B1
(45) Date of Patent: *May 16, 2006

(54) VOLUME REDUCTION OF AQUEOUS WASTE BY EVAPORATIVE CRYSTALLIZATION OF BURKEITE AND SODIUM SALTS

(75) Inventor: Donald James Geniesse, Richland, WA (US)

(73) Assignee: Cogema, Inc., Richland, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/901,442

(22) Filed: Jul. 29, 2004

Related U.S. Application Data (63) Continuation of application No. 10/101,562, filed on Mar. 20, 2002, now Pat. No. 6,787,120.

(60) Provisional application No. 60/365,171, filed on Mar. 19, 2002, provisional application No. 60/276,920, filed on Mar. 20, 2001.

(51) Int. Cl.
   *C01D 3/08* (2006.01)

(52) U.S. Cl. ........................... 423/179; 423/544

(58) Field of Classification Search ................ 423/421, 423/419.1, 428, 429, 544, 551, 179; 588/11
See application file for complete search history.

(56) References Cited

U.S. PATENT DOCUMENTS

| | | | | |
|---|---|---|---|---|
| 2,392,888 A | * | 1/1946 | Suhr et al. | 423/193 |
| 4,519,806 A | * | 5/1985 | Copenhafer et al. | 23/302 T |
| 4,564,508 A | * | 1/1986 | Fairweather et al. | 423/189 |
| 4,565,612 A | * | 1/1986 | Fry | 210/702 |
| 6,787,120 B1 | * | 9/2004 | Geniesse | 423/421 |

* cited by examiner

*Primary Examiner*—Edward M. Johnson
(74) *Attorney, Agent, or Firm*—Morgan, Lewis & Bockius LLP (57) ABSTRACT

A method of treating aqueous salt solutions to provide a solution suitable for vitrification to a stable glass matrix for long term storage is described. In particular, salt solutions composed of aqueous nuclear waste materials are suitable for treatment by the described method. Specifically, salt solutions which have a sulfate to sodium mole ratio that does not permit easy vitrification into stable glasses may be treated by the present invention. The present method decreases the volume of vitrified glass.

11 Claims, 4 Drawing Sheets

VOLUME REDUCTION OF AQUEOUS WASTE BY EVAPORATIVE CRYSTALLIZATION OF BURKEITE AND SODIUM SALTS

The present application is a continuation application of U.S. patent application Ser. No. 10/101,562 (filed Mar. 20, 2002), now U.S. Pat. No. 6,787,120, which claims the benefit of U.S. Provisional Application 60/276,920 (filed Mar. 20, 2001), and U.S. Provisional Application 60/365,171 (filed Mar. 19, 2002) all of which are herein incorporated by reference in their entirety.

BACKGROUND OF THE INVENTION

1. Field of the Invention

This invention relates to methods of treating aqueous salt solutions to provide a solution suitable for vitrification to a stable glass matrix for long term storage. The present process involves removal by crystallization of burkeite, a congruent double salt with the chemical formula, $Na_6(SO_4)_2(CO_3)$, and sodium complex salts from aqueous salt solutions. In particular, salt solutions composed of aqueous nuclear waste materials are suitable for treatment by the invention. Specifically, salt solutions which have a sulfate to sodium mole ratio that does not permit easy vitrification into stable glasses may be treated by the present invention.

2. Discussion of the Related Art

Large volumes of radioactive aqueous waste have been generated during plutonium production and other nuclear operations. These wastes are stored in storage tanks at various locations, for instance, the U.S. Department of Energy's ("DOE") Hanford, Wash. site. At present, the DOE Hanford site stores approximately 50 million gallons of radioactive aqueous waste. Major components in the waste include various soluble and insoluble compounds including salts of sodium, aluminum, and phosphorous including some of the sulfate, nitrate, nitrite, oxide, carbonate, and hydroxide salts of those metals. In these complex mixtures, the solubility of a specific salt will obviously depend on such factors as temperature and pH of the mixture. Radioactive components in the aqueous waste include strontium, cesium, technetium, cobalt, uranium, and plutonium.

Present plans for disposal of these waste solutions call for the vitrification of the liquid wastes into glass matrices suitable for stable long-term storage. The vitrification process requires that the composition of the waste solution fall within certain parameters to ensure production of a stable glass matrix without formation of undesirable salt phases. One such parameter is the sulfate to sodium mole ratio, which if in excess of 0.01 $SO_4^{-2}/Na^+$, the sodium sulfate present may exceed the glass solubility limit, and form a non-miscible salt phase during the vitrification process. These non-miscible sulfate salts can corrode the refractory lining of ceramic-lined vitrification units, and thus significantly reduce the operating life of the vitrification equipment. Furthermore, in sufficient quantity, the accumulation of non-miscible sulfate salts provides an electrically preferred circuit in Joule-heated vitrification melters, thus bypassing the molten glass matrix and significantly reducing the waste processing rate. Presently, the sulfate to sodium mole ratio in numerous DOE Hanford aqueous waste tanks exceeds the glass solubility limit.

Sodium sulfate can be a major contaminant to the vitrification process. At DOE Hanford, for instance, sodium sulfate accounts for approximately 3.3% of the total sodium salts. Under the current processing approach to meet the sulfate vitrification specification, additives, such as sodium hydroxide, must be added to the waste to reduce sodium sulfate to less than 2% of the total sodium salts. By this method, the amount of vitrification glass and processing time are increased proportionally to the amount of sodium hydroxide added to the waste.

Sodium sulfate has limited solubility in glass. In equilibrated solutions, sodium sulfate solubility in glass is 0.5 wt % $SO_3$ at a $Na_2O$ concentration of 14 wt. %. See VSL-00R3630-1, *Summary of Preliminary Results on Enhanced Sulfate Incorporation During Vitrification of LAW Feeds*, I. L. Pegg, et al., Vitreous State Laboratory, The Catholic University of America, Washington D.C. This corresponds to a $SO_4^{-2}/Na^+$ mole ratio of 0.013. Experimental testing of glass mixtures indicates that a molten sulfate salt layer forms well before the glass melt is saturated with sodium sulfate. The sulfate concentration at which a salt phase forms has not been quantified, but thick salt layers have been observed in test melters at less than three-quarters of sulfate glass saturation.

Presence of a molten sulfate salt phase in the melter is highly undesirable for several reasons. Feeding slurry onto a molten sulfate layer could cause over-pressurization or steam explosion in the melter. See DOE/RL-98-01, Rev. 3 *Sulfate Mitigation for Hanford Tank Low Activity Waste Vitrification*, Technology Needs/Opportunities Statement RL-WT101. Molten sulfate salts are more corrosive than the glass melt, can penetrate the refractory of the melter, and cause electrical shorting and corrosion of the melter components. These molten sulfate phases also tend to sequester a variety of hazardous and radioactive elements, including, for example, cesium and chromium. Furthermore, the sulfate salts are highly soluble in water, which renders the glass product unacceptable for long-term storage.

In addition, sulfate may be reduced to sulfur dioxide in the melter, which may be absorbed in a caustic scrubber, to be recycled to the melter, or it may escape the system altogether and become an atmospheric pollutant.

Clearly, the presence of sulfate in the vitrification system is detrimental to safety, the equipment, the resulting glass, and the environment. At the current sulfate feed concentrations of DOE Hanford aqueous wastes, sodium sulfate will frequently be above the saturation concentration in the glass and thus a molten salt phase is expected to occur. The DOE Hanford aqueous waste contains approximately 4,800 metric tons of sodium sulfate.

The current processing approach to adjust the sulfate/sodium ratio to below 0.010 $SO_4^{-2}/Na^+$ is to add additives, such as sodium hydroxide, to the aqueous waste until the desired ratio is reached. By this method, the resulting amount of glass and processing time, are both increased by approximately 86% over a non-sulfate containing vitrification feedstock. Additionally, the addition of the required amounts of sodium hydroxide significantly increases the treatment cost.

Others have tried unsuccessfully to adjust the sulfate/sodium ratio by decreasing the sulfate concentration through removal of sulfate by evaporation and selective precipitation of sulfate, and concluded that evaporation is not a viable option for removing sulfate. See PNWD-3036; BNFL-RPT-018, *Removal of Sulfate Ion From AN-107 by Evaporation*, G. J. Lumetta, et al., Pacific Northwest National Lab., Richland, Wash. Clearly there is a need for a method to process radioactive aqueous waste with high sulfate/sodium ratios generated by nuclear activities to permit such waste to be vitrified into stable glass matrices. Ideally such a sulfate/sodium ratio adjustment process would decrease chemical costs, processing expense, and volume of glass matrix produced, while removing both sulfate and sodium containing compounds in a stable form.

SUMMARY OF THE INVENTION

The present invention meets the above-stated needs and overcomes the drawbacks of the current processing approach by removing sulfate, in the form of stable burkeite, to adjust the sulfate/sodium ratio of aqueous radioactive waste solutions to permit vitrification without increasing glass volume with additives or forming non-miscible sulfate salts. In particular, the present invention accomplishes these objectives by providing a process for the removal of burkeite from a salt solution containing aluminum ions, nitrite ions, nitrate ions, sodium ions, calcium ions, and sulfate ions. The inventive process involves either adding water and heating, or adding alkali to form a solution containing alkali soluble compounds, followed by optionally filtering the solution to remove any undissolved solids and to produce a solution essentially free of solids. The undissolved solids are typically wastes which are higher in radioactivity than the solution. Excess water is then evaporated from the solution essentially free of solids to produce a saturated solution from which burkeite is precipitated, by evaporative crystallization, and separated.

The present inventive process may reduce sulfate by an order of magnitude, well below the glass solubility limit, and prevent a molten salt phase from forming in the melter.

The present inventive process for the removal of burkeite from a salt solution containing aluminum ions, sodium ions, calcium ions, and sulfate ions involves adding alkali to a salt solution comprising salts containing aluminum ions, nitrite ions, nitrate ions, carbonate ions, sodium ions, calcium ions, and sulfate ions to form a solution containing alkali soluble compounds, then optionally filtering the solution to remove any undissolved solids and to produce a solution essentially free of solids. Excess water is then evaporated from this solution to produce a saturated solution. Burkeite is then precipitated, preferably by evaporative crystallization, from the saturated solution, and finally separated from the saturated solution.

Additional processing measures which may also be applied to the salt solution, prior to the evaporating step, include oxidizing any organic compounds present in the salt solution, precipitating any strontium containing compounds present in the salt solution, and removing any radionuclides present in the salt solution. Among the radionuclide's which may be removed are cesium and technetium, typically ion exchange may be used.

The salt solutions processed by the present inventive method may be composed of salts which contain at least one negatively charged member selected from the group consisting of, for example, carbonate, chromate, fluoride, hydroxide, nitrite, nitrate, oxide, silicate, sulfate, and phosphate, and one positively charged member selected from the group consisting of, for instance, aluminum, barium, calcium, cesium, iron, manganese, nickel, sodium, strontium, technetium, plutonium, potassium, uranium, and zirconium.

After the burkeite is separated from the saturated solution, it may be solubilized and reprecipitated by addition of either or both of calcium carbonate and barium sulfate, using conventional technology.

Typically alkali may be added only until any amphoteric aluminum compounds present in the salt solution are solubilized. Alkali compounds that may be used for dissolving aluminum solids include, for example, sodium hydroxide, potassium hydroxide, calcium hydroxide, and other hydroxide containing compounds.

Evaporative crystallization may be utilized to precipitate burkeite from the saturated solution. This evaporative crystallization may occur within a forced circulation evaporator. It is preferable that the saturated solution be essentially free of solids prior to undergoing evaporative crystallization.

After separation of the precipitated burkeite the saturated solution may be vitrified according to methods known in the art. The saturated solution may be vitrified alone, or it may be combined with other salt solutions then vitrified. In some cases, additional $Na^+$ may need to be added to reach a suitable $SO_4^{-2}/Na^+$ mole ratio to produce a glass matrix suitable for long-term storage.

Another embodiment of the present invention is a process for the removal of burkeite from a radioactive salt solution by treating the radioactive salt solution to produce a saturated salt solution essentially free of solids. Burkeite is then precipitated from the saturated salt solution, and finally separated from the saturated salt solution.

Additional processing steps that may occur prior to precipitating burkeite include adding alkali, separating alkali insoluble compounds, oxidizing organic compounds, precipitating strontium containing compounds, removing radionuclides, and then evaporating excess water.

Yet another embodiment of the invention is a method to reduce the sulfate concentration of a salt solution by adding alkali to a salt solution comprising salts containing aluminum ions, nitrite ions, nitrate ions, carbonate ions, sodium ions, calcium ions, and sulfate ions to form a solution containing alkali soluble compounds. Optionally, this solution may then be filtered to remove any undissolved solids and to produce a solution essentially free of solids. The undissolved solids are typically higher in radioactivity than the solution. Excess water may be evaporated from the solution essentially free of solids to produce a saturated solution. Sulfate-rich material may be precipitated from the saturated solution, and then the precipitated sulfate-rich material may be separated from the saturated solution.

A different embodiment of the present invention may be a process for the removal of burkeite and sodium-containing complex salts from a salt solution containing aluminum ions, nitrite ions, nitrate ions, carbonate ions, sodium ions, calcium ions, fluoride ions and sulfate ions by adding hydroxide to a salt solution comprising salts containing aluminum ions, nitrite ions, nitrate ions, carbonate ions, sodium ions, calcium ions, fluoride ions, and sulfate ions to solubilize aluminum containing compounds thereby to form a solution containing soluble aluminum compounds from the salt solution. Optionally, any undissolved solid material may be filtered off from the solution containing soluble aluminum compounds to produce a solution essentially free of solids. Excess water may be evaporated from the solution essentially free of solids to produce a saturated solution. Burkeite and sodium-containing complex salts may be precipitated from the saturated solution, and then the precipitated burkeite and sodium-containing complex salts may be separated from the saturated solution.

This embodiment may further include one or more of the following steps as known in the art, prior to the evaporating step: oxidizing any organic compounds present in the salt solution, precipitating any strontium containing compounds present in the salt solution, and removing any radionuclides present in the salt solution.

The radionuclides may be cesium and technetium, and may be removed by ion exchange, or other conventional ion separation techniques.

The saturated solution may be vitrified after separation of the precipitated burkeite and sodium-containing salts to obtain a glass matrix suitable for long-term storage. The vitrification may be accomplished by conventional processes.

A further embodiment of the present invention involves the co-crystallization and removal of sodium-containing complex salts, such as, the carbonate, sulfate, and fluoride salts of sodium along with the burkeite. Additional sodium carbonate salts include, for example, the anhydrate, and the mono-, hepta-, and deca-hydrates. Further sodium sulfate compounds include sesquiburkeite ($Na_2SO_4.Na_2CO_3$) and anhydrous sodium sulfate. Sodium fluoride salts may include sodium fluoride, and trisodium fluoride sulfate.

These sodium-containing complex salts may be crystallized and removed during the burkeite evaporative crystallization process. The removal of these sodium salts has the additional benefits of further reducing the volume of radioactive glass, avoiding increased corrosive effects, and increasing glass stability.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

The present invention decreases the volume of aqueous waste by removing both sulfate and sodium-containing complex salts through an evaporative crystallization process. Specifically, the present invention reduces sulfate in aqueous waste by either adding water and heating, or adding alkali to sulfate-rich vitrification feedstocks, evaporating excess water, precipitating and separating burkeite, a congruent double salt with the chemical formula, $Na_6(SO_4)_2(CO_3)$. The precipitation of burkeite is accomplished by evaporative crystallization. This reduction in sulfate either brings the $SO_4^{-2}/Na^+$ mole ratio of the feedstock below the present 0.010 $SO_4^{-2}/Na^+$ glass formulation limit, or greatly reduces the amount of additional glass additives required to meet the ratio. In turn, this process reduces the volume of material to be treated and the resulting amount of glass produced.

Sulfate-rich vitrification feedstocks typically may have sulfate concentrated in the crust, supernatant, and/or sludge layer. The sulfate-rich phase may be separated by decantation, filtration or other separation techniques known in the art from any phases meeting the sulfate to sodium specification.

The sulfate-rich feedstock solution may be treated by adding alkali, typically sodium hydroxide, to dissolve alkali soluble compounds, and separating alkali insoluble materials. This process step may be carried out in existing storage tanks, or in a separate operation location. This step is also known as caustic leaching, or enhanced sludge washing. Of particular interest in the present invention is to add sufficient sodium hydroxide to cause dissolution of solid amphoteric aluminum compounds, such as aluminum trihydroxide and/or dawsonite, $NaAlCO_3(OH)_2$.

Alternatively, and dependent on the exact chemical composition of the feedstock, addition of only water and heating will dissolve the insoluble materials, including amphoteric aluminum solids. The availability of hydroxide ions in the waste is one factor considered in whether addition of additives, such as NaOH, is needed to dissolve any amphoteric aluminum solids, or whether such dissolution will occur with the addition of water only.

Optionally, the mixture may be filtered to remove any undissolved solids. Such undissolved solids are typically higher in radioactivity than the solution.

The high alkali sulfate-rich solution is then saturated by preheating and evaporating the solution to the burkeite solubility limit. The evaporation process may be carried out in either a batch-wise or a continuous manner.

This saturated solution may be further evaporated in an evaporative crystallization process so that the solution exceeds the burkeite solubility limit, and burkeite crystallizes from solution. Crystal seeding with sodium sulfate and/or burkeite may be used to introduce crystal nuclei and increase the sulfate yield and selectivity. Additional sodium-containing complex salts of sulfate, carbonate, and fluoride may be co-crystallized with burkeite to further reduce the amount of sodium fed to the vitrification process.

The evaporative crystallization process of the present invention may be carried out in a conventional forced-circulation evaporator designed for evaporative crystallization, such as that available from Swenson Process Equipment of Monee, Ill.

During the evaporative crystallization process, the temperature of the solution may be between about 50° C. and about 150° C. with the pressure between about 0.2 atmosphere to about 2 atmospheres. Preferably the pressure is between about 0.1 atmosphere to about 1 atmosphere. The most preferred evaporative crystallization conditions employ a solution temperature between about 80° C. and about 120° C. at pressure of about 0.2 atmosphere.

The precipitated solid burkeite, and, if present, other precipitated complex sodium-containing salts, are separated from the aqueous phase and isolated from the vitrification process. Accordingly the inventive process may be used to remove other complex salts such as sodium-containing complex salts, such as, the carbonate, sulfate, and fluoride salts of sodium along with the burkeite. Additional sodium-containing salts include, for example, the anhydrate, and the mono-, hepta-, and deca-hydrates of sodium carbonate, further sodium sulfate compounds include sesquiburkeite ($Na_2SO_4.Na_2CO_3$) and anhydrous sodium sulfate, and sodium fluoride salts may include sodium fluoride, and trisodium fluoride sulfate. The aqueous phase, thus depleted in sulfate, and perhaps sodium, is fed to a vitrification process. A conventional vitrification process is described in U.S. Pat. No. 6,258,994, the disclosure of which is hereby incorporated by reference in its entirety.

The present inventive methods utilize the thermodynamically favored, naturally occurring congruent double salt of sodium sulfate and sodium carbonate, burkeite, to selectively reduce the quantity of sulfate from aqueous phase radioactive waste. By treating the waste solution prior to evaporative crystallization of burkeite, precipitation of unwanted compounds that do not decrease the sulfate concentration is avoided. Following crystallization, burkeite solids are separated from the aqueous liquor which now meets or is closer to the sulfate/sodium ratio target for vitrification.

Burkeite has a 2:1 sodium sulfate ($Na_2SO_4$) to sodium carbonate ($Na_2CO_3$) mole ratio and a 71:29 sodium sulfate to sodium carbonate mass ratio. Because of this mass ratio, evaporative crystallization of solid burkeite from the aqueous phase preferentially removes sulfate from the aqueous phase.

Burkeite, and its component salts, anhydrous sodium carbonate and sodium sulfate, all exhibit retrograde solubility, that is, decreasing solubility with increasing temperature. A solubility diagram of the sodium sulfate-sodium carbonate system is shown in FIG. 1.

Figure 1:
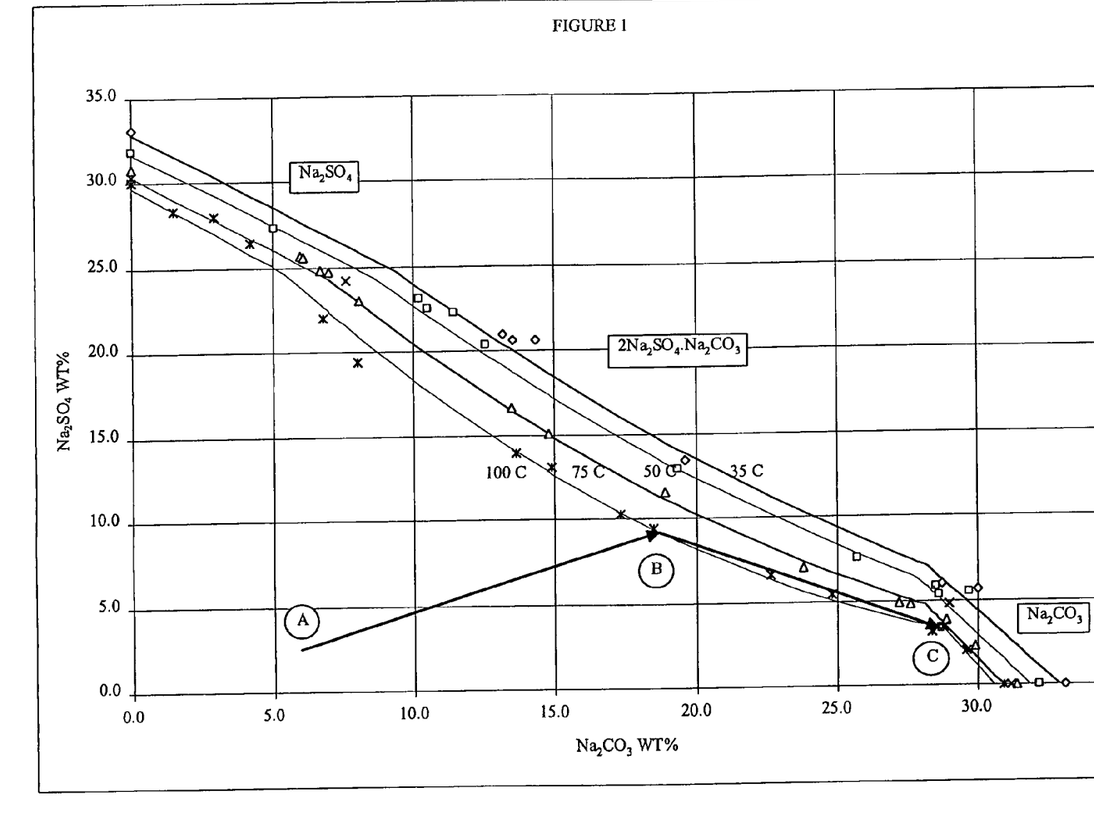
FIG. 1—Solubility diagram of sodium sulfate and sodium carbonate with burkeite solubility as a function of temperature and concentration of sodium sulfate and sodium carbonate graphed thereon.

The burkeite evaporative crystallization process is outlined on the sodium sulfate-sodium carbonate solubility diagram in FIG. 1. Upon evaporation of the sulfate-rich carbonate solution (Point A), the concentrations of sodium sulfate and sodium carbonate increase proportionally up to the burkeite solubility limit at atmospheric pressure (Point B). During burkeite crystallization, the aqueous phase is reduced in sulfate mass in a 71:29 mass ratio to carbonate, along the burkeite solubility curve, to the burkeite-sodium carbonate invariant (Point C). Upon further evaporation, burkeite and sodium carbonate co-crystallize from solution.

Figure 2:
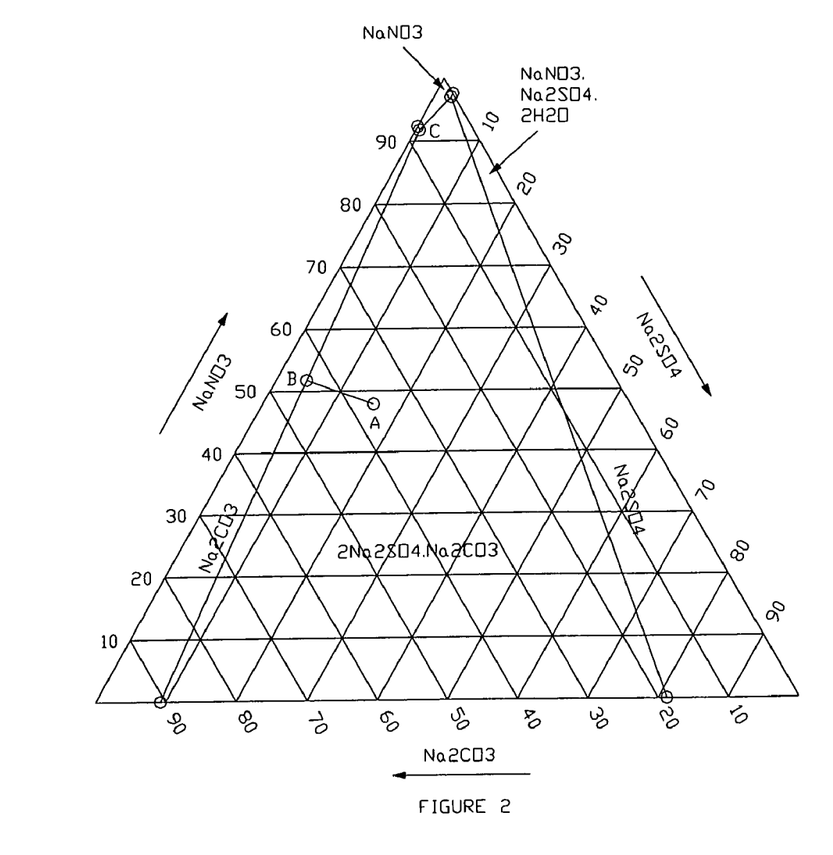
FIG. 2—Solubility diagram of the ternary system—sodium sulfate, sodium carbonate, and sodium nitrate as a function of temperature and concentration.

The effect of additional soluble sodium salts on burkeite solubility is shown in FIG. 2. At saturation, burkeite crystallizes from an aqueous solution having the initial concentration depicted at point A. As burkeite crystallizes from the aqueous solution, the aqueous phase becomes depleted in both sodium sulfate and sodium carbonate until the sodium carbonate solubility limit is reached at invariant point B. Burkeite and sodium carbonate then co-crystallize along the univariant line to the sodium nitrate solubility limit, point C. At this point, evaporation is terminated, and both burkeite and sodium carbonate are separated from the aqueous solution.

The present inventive process may be utilized on salt solutions of varying complexity and composition. The co-crystallization of both burkeite and other sodium-containing complex salts from the salt solution decreases the concentration of both sulfate and sodium ions in the salt solution with concurrent reduction in the volume of the salt solution. The volume reduction may also be reflected in the smaller volume of glass produced by the vitrification of the remaining salt solution.

EXAMPLE 1

Figure 3:
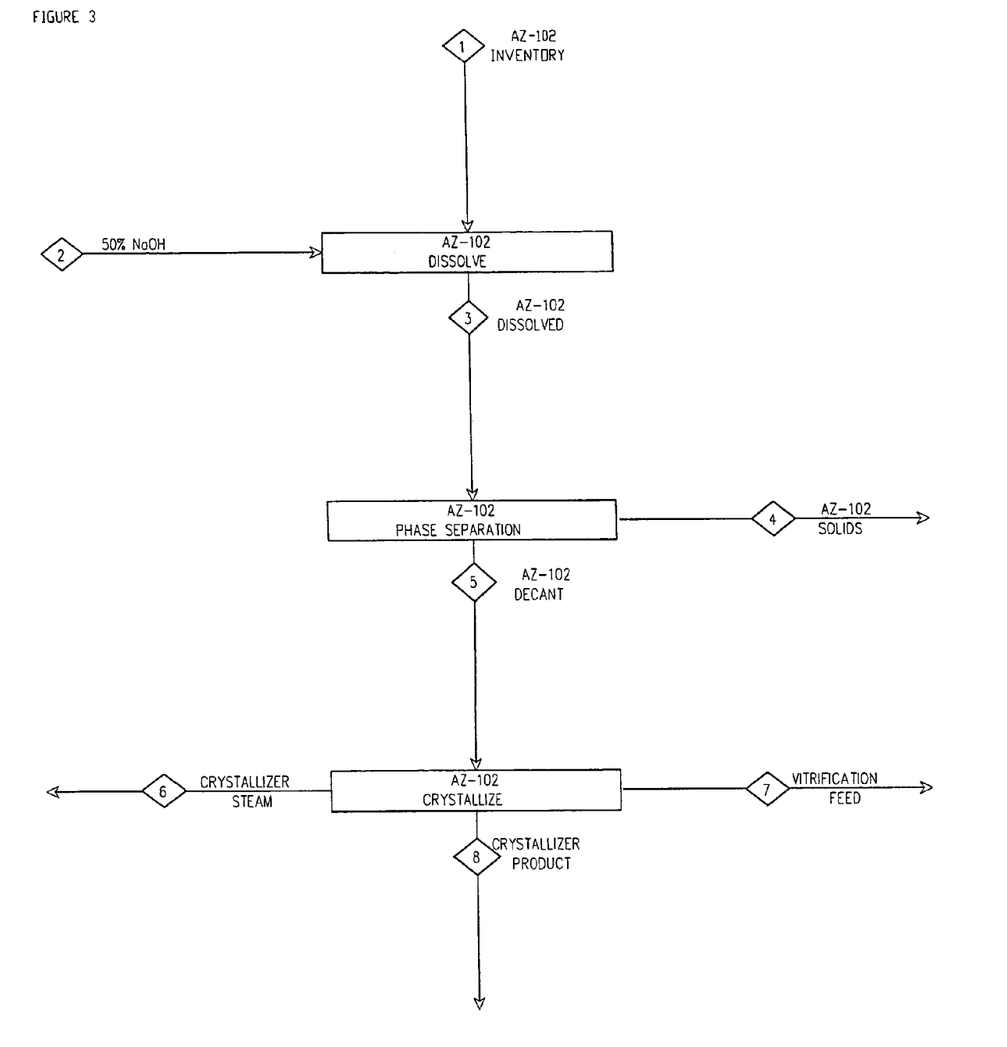
FIG. 3—Block flow diagram of one embodiment of the inventive process as applied to DOE Hanford waste tank AZ-102.

Application of the inventive process for sulfate removal to aqueous waste from DOE Hanford Waste Tank AZ-102 is graphically depicted in FIG. 3. Theoretical material mass balances for the various steps are presented in Table 1. In this example, 3,748 m³ of radioactive aqueous waste containing 96,085 kilograms of sodium sulfate with an initial sulfate to sodium mole ratio of 0.069, and 4.1% solids would be treated by the inventive process.

Sodium hydroxide (approximately 640,000 kilograms of a 50% solution) would be added to dissolve amphoteric aluminum compounds and alkali soluble sodium compounds. Insoluble aluminum trihydroxide is converted to soluble aluminum tetrahydroxide ions by reaction with sodium hydroxide, reducing the total solids from 4.1 to 2.1%.

The next step would be to decant the aqueous phase to separate residual insoluble solids from the solution. Residual insoluble compounds would include, for example, oxides of iron, manganese, nickel, and zirconium, along with radioactive compounds of uranium, strontium, and plutonium.

The decanted solution would then undergo evaporative crystallization of burkeite. The evaporator would be seeded with burkeite and/or sodium sulfate crystals to provide nucleation sites for the crystallization. In this example, at a temperature of 52° C. and 0.2 atmospheres, approximately 1,845,400 kilograms of water would be evaporated from the radioactive waste.

The evaporative crystallizer product would contain approximately 68,607 kilograms of sodium sulfate in approximately 94,208 kilograms of burkeite. This quantity equates to removal of 71.4% of the total sulfate present in the AZ-102 waste.

Following burkeite crystallization, the solid phase would be mechanically separated from the aqueous liquor, and isolated from the vitrification plant feedstock. The aqueous phase would then be fed to the vitrification plant.

In this example, the aqueous phase would have a final sulfate to sodium mole ratio of 0.012. In order to meet the glass formulation constraint of 0.010 mole ratio, approximately 267,600 kilograms of 50% sodium hydroxide would have to be added to the solution.

The inventive removal process would reduce the net amount of glass waste produced from DOE Hanford Tank AZ-102 by a factor of 3.5 relative to untreated waste.

COMPARATIVE EXAMPLE 2

Under the current processing approach to meet the glass formulation constraint of 0.010 $SO_4^{-2}/Na^+$, sodium hydroxide would be added to the AZ-102 waste. This approach would require approximately 4,661,200 kilograms of 50% sodium hydroxide added to the waste. This approach would increase the total amount of sodium by a factor of 5.9, and the mass of glass to be produced by vitrification would increase by the same factor, both relative to untreated waste.

EXAMPLE 3

Figure 4:
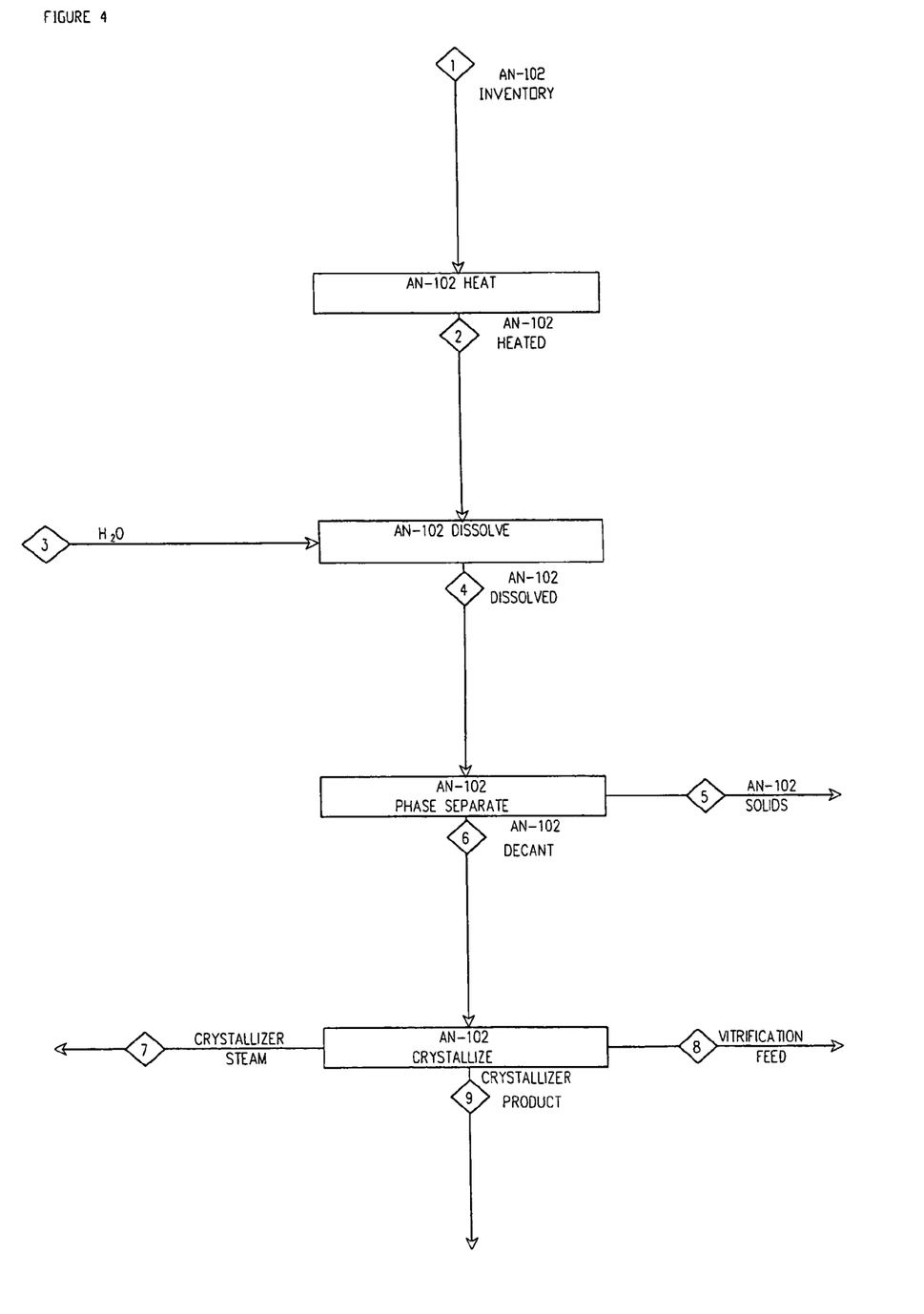
FIG. 4—Block flow diagram of one embodiment of the inventive process applied to DOE Hanford waste tank AN-102.

Application of the inventive process for sulfate removal to aqueous waste from DOE Hanford Waste Tank AN-102 is graphically depicted in FIG. 4. Theoretical material mass balances are presented in Table 2. In this example, 3,981 m³ of radioactive aqueous waste containing 105,401 kilograms of sodium sulfate with an initial sulfate to sodium mole ratio of 0.019 and 4.3% solids would be treated by the inventive process.

Due to the composition of the AN-102 waste solution, addition of NaOH is not required prior to the evaporative crystallization of burkeite. Thus, the sulfate removal process would begin by adding approximately 411,950 kilograms of dilution water and heating to 50° C. to dissolve solid sodium compounds. AN-102 solids include both trisodium fluoride sulfate and burkeite.

The next step would be to decant the aqueous phase to separate residual insoluble solids from the solution. Residual insoluble compounds include, for example, oxides of iron, manganese, nickel, and zirconium, along with radioactive compounds of uranium, strontium, and plutonium, for example.

The decanted solution would then undergo evaporative crystallization to obtain burkeite. The evaporative crystallizer could be seeded with burkeite and/or sodium sulfate crystals to provide nucleation sites for the crystallization. In this example, approximately 317,590 kilograms of water would be evaporated at a temperature of 52° C. and 0.2 atmospheres. Water would be evaporated from the solution until the burkeite-sodium carbonate monohydrate invariant of 0.14 is reached. Beyond this point, burkeite and sodium carbonate co-crystallize from solution.

The evaporative crystallizer product would contain approximately 33,354 kilograms of sodium sulfate in approximately 45,800 kilograms of burkeite. This quantity equates to removal of approximately 31.7% of the total sulfate present in the AN-102 waste.

Following burkeite evaporative crystallization, the solid phase would then be mechanically separated from the aqueous liquor, and isolated from the vitrification plant feedstock. The aqueous phase would then be fed to the vitrification plant.

In this example, the aqueous phase would have a final sulfate to sodium mole ratio of 0.013. In order to meet the glass formulation constraint of 0.010 mole ratio, approximately 990,500 kilograms of 50% sodium hydroxide would be added to the solution.

The inventive removal process reduces the net amount of glass waste produced from DOE Hanford Tank AN-102 by 31.7% relative to untreated waste.

COMPARATIVE EXAMPLE 4

Under the current processing approach to meet the glass formulation constraint of 0.010 $SO_4^{-2}/Na^+$ mole ratio, sodium hydroxide would be added to the AN-102 waste. This approach would require approximately 2,746,400 kilograms of 50% sodium hydroxide added to the waste. This approach would increase the total amount of sodium by 86%; the mass of glass to be produced by vitrification would increase by the same factor, both relative to untreated waste.

EXAMPLE 5

Laboratory scale experiments were run to demonstrate the present inventive method. X-ray diffraction analysis of the resulting products was completed in order to confirm the validity of the method.

Table 3 is a material mass balance for the five solutions of the experiment. The amounts of raw reactants, products, and by-products of the five solutions are tabulated therein. Evaporative crystallization of burkeite was carried out under the conditions specified in Table 3.

All experiments were carried out in a ventilation hood using a 1-liter glass reaction vessel with a magnetic stir bar. A heating mantle and a condenser set up were used for heating and collection of water vapor from the reaction vessel respectively.

Deionized water was quantitatively measured and added to the reaction vessel. Chemical reagents were then measured and added to the reaction vessel. The solution was agitated and/or heated until all solids were dissolved. Heating and stirring were continued until the appropriate amount of condensed water vapor was collected in a condensate receiver. The hot slurry was filtered through a buchner funnel to prevent impurity crystallization by cooling. The mass of the filter cake was measured. The filter cake was dried in an oven at 110° C. The mass of crystals was recorded and the composition of crystals collected was analyzed by X-ray diffraction (XRD), and are presented in Table 4.

The diffraction data were collected on a Siemens D-500 diffractometer using a slit combination which provides the greatest resolution. To further maximize resolution the data were collected using a small step size (0.02 degrees 2-theta). XRD data collected on a Philips XRD3100 X-ray diffractometer equipped with a copper x-ray tube (energized at 40 KV and 35 ma), a graphite monochrometer and a theta compensation variable slit were compared with those from the Siemens D-500 diffractometer. The samples were scanned from 4 to 64 degrees 2-theta at 1 degree per minute.

Solution A was a mixture of water, sodium carbonate, and sodium sulfate only. Sodium carbonate is the main impurity to burkeite crystallization, burkeite will form only if the sodium sulfate to sodium carbonate ratio is greater than 0.14. Otherwise, burkeite and sodium carbonate co-crystallize with low sulfate yield.

Solution B included the chemicals in Solution A with the addition of sodium nitrate and sodium nitrite, the main components of DOE Hanford aqueous waste. A double salt of sodium sulfate and sodium nitrate (darapskite) is theoretically possible at high nitrate concentrations.

Solution C included the chemicals in Solution B plus sodium hydroxide and aluminum hydroxide. Aluminum sludge is a large component of DOE Hanford waste. Aluminum solubility is exponentially proportional to pH. Sodium hydroxide will increase pH to a range where aluminum is highly soluble, and aluminum sludge will completely dissolved.

Solution D included the chemicals in Solution C plus sodium fluoride. A double salt of sodium sulfate and sodium fluoride is possible at high fluoride concentrations. However, at the NaF concentration in AZ-102, $Na_3FSO_4$ is not expected to form. This method may be used to increase sulfate yield by fortifying the solution with sodium fluoride and precipitating $Na_3FSO_4$.

Solution E included all the above chemicals and sodium oxalate. Sodium oxalate is the principal organic component of DOE Hanford aqueous waste. It is saturated in AZ-102 and most DOE Hanford aqueous waste. Sodium oxalate is expected to co-crystallize with burkeite at a ratio of 1:10 $Na_2C_2O_4$ to burkeite.

Data Analysis for Solutions A–E

Manual matching of JCPDS (Joint Committee of Powder Diffraction) file patterns, which are listed below, of the X-ray diffraction for the samples provided the following results:

Solution A—a mixture of three phases: sodium carbonate, $Na_2CO_3$ (25-0815), sodium carbonate sulfate, $Na_4CO_3SO_4$ (24-1138), and burkeite, $Na_6CO_3(SO_4)_2$ (24-1134).

Solution B—a mixture of three phases: $Na_2CO_3$ (25-0815), possibly sodium carbonate sulfate (24-1138), and burkeite (24-1134).

Solution C—a mixture of three phases: $Na_2CO_3$ (25-0815), possibly sodium carbonate sulfate (24-1138), and burkeite (24-1134).

Solution D—a mixture of two phases $Na_2CO_3$ (25-0815) and burkeite (24-1134).

Solution E—three phases $Na_2CO_3$ (25-0815), burkeite (24-1134) and sodium oxalate.

Although the foregoing description is directed to the preferred embodiments of the invention, it is noted that other variations and modifications will be apparent to those skilled in the art, and may be made without departing from the spirit or scope of the invention.

TABLE 1

| AZ-102 BURKEITE CRYSTALLIZATION | AZ-102 INVENTORY kg | 50% NaOH kg | AZ-102 DISSOLVED kg | AZ-102 DECANT kg | AZ-102 SOLIDS kg | CRYSTALLIZER STEAM kg | CRYSTALLIZER LIQUOR kg | CRYSTALLIZER PRODUCT kg |
|---|---|---|---|---|---|---|---|---|
| $H_2O$ | 3,442,200 | 319,770 | 3,778,700 | 3,778,700 | | 1,872,600 | 1,906,200 | |
| Aqueous Species: | | | | | | | | |
| $Na_2SO_4$ | 96,088 | | 96,085 | 96,085 | | | 27,479 | |
| $Na_2CO_3$ | 222,927 | | 224,260 | 224,260 | | | 198,667 | |
| NaOH | | 319,770 | 269,360 | 269,360 | | | 270,090 | |
| $NaNO_2$ | 179,310 | | 188,630 | 188,630 | | | 188,620 | |
| $NaNO_3$ | 84,369 | | 83,183 | 83,183 | | | 83,173 | |
| $K_2O$ | 10,482 | | 11,222 | 11,222 | | | 10,791 | |
| $Na_2Cr_{VI}O_4$ | 7,186 | | 8,745 | 8,745 | | | 8,746 | |
| $HNO_2$ | 5,672 | | | | | | 0 | |
| $(NaAlO_2)_2 \cdot 2.5(H_2O)$ | 3,642 | | 118,200 | 118,200 | | | 117,260 | |
| NaF | 8,795 | | 8,795 | 8,795 | | | 8,795 | |
| $Na(C_2H_3O_2)$ | 2,787 | | 2,790 | 2,790 | | | 2,779 | |
| $Na_2UO_4$ | 1,714 | | 0 | 0 | | | 0 | |
| $NaAlCO_3(OH)_2$ | 1,199 | | | | | | | |
| $Cr_{III2}O_3$ | 732 | | | | | | | |
| $Na_7F(PO_4)_2 \cdot 19H_2O$ | 590 | | 588 | 588 | | | 586 | |
| NaCl | 543 | | 543 | 543 | | | 542 | |
| $NaHCO_3$ | 355 | | 5 | 5 | | | 2 | |
| $CsNO_3$ | 248 | | 153 | 153 | | | 187 | |
| $NaHSiO_3$ | 225 | | 1,828 | 1,828 | | | 928 | |
| $NaTc_{VII}O_4$ | 87 | | 87 | 87 | | | 87 | |
| $Bi_2O_3$ | 73 | | 73 | 73 | | | 74 | |
| $Cs_2O$ | 36 | | 106 | 106 | | | 81 | |
| $K(C_2H_3O_2)$ | 29 | | 27 | 27 | | | 40 | |
| $Cs(C_2H_3O_2)_2$ | 6 | | 3 | 3 | | | 2 | |
| $Hg(OH)_2$ | 4 | | 4 | 4 | | | 4 | |
| Solid Species: | | | | | | | | |
| $Al(OH)_3$ | 83,652 | | 0 | 0 | | | 0 | |
| $Fe_{III}O(OH)$ | 59,295 | | 59,295 | | 59,295 | | | |
| $Na_2C_2O_4$ | 20,294 | | 20,294 | 8,758 | 11,537 | | 1,058 | 7,700 |
| $KAlSiO_4$ | 10,738 | | 8,259 | | 8,259 | | | 1,423 |
| $ZrO_2$ | 7,502 | | 7,502 | | 7,502 | | | |
| $Na_2U_2O_7$ | 3,763 | | 5,325 | | 5,325 | | | 0 |
| $LaPO_4 \cdot 2H_2O$ | 2,671 | | 2,671 | | 2,671 | | | |
| $Ni(OH)_2$ | 2,381 | | 2,381 | 3 | 2,377 | | 3 | |
| $Ca_5(OH)(PO_4)_3$ | 1,895 | | 1,896 | | 1,896 | | | 1 |
| $MnO_2$ | 1,506 | | 1,506 | | 1,506 | | | |
| $Pb(OH)_2$ | 351 | | 351 | 5 | 347 | | 5 | |
| $SrCO3$ | 83 | | 83 | | 83 | | | 0 |
| $Pu_{IV}(OH)_4$ | 56 | | 56 | 0 | 56 | | 0 | 0 |
| $Na_6(SO_4)_2CO_3$ | | | | | | | | 94,208 |
| Total kg | 4,263,486 | 639,540 | 4,903,007 | 4,802,153 | 100,854 | 1,872,600 | 2,826,200 | 103,332 |
| $Na_2SO_4/Na_2CO_3$ | 0.43 | | 0.43 | 0.43 | | | 0.14 | |
| Na+/SO4− | 0.069 | | 0.038 | 0.038 | | | 0.012 | |

TABLE 2

| AN-102 BURKEITE CRYSTALLIZATION | AN-102 INVENTORY kg | AN-102 HEATED kg | H2O kg | AN-102 DISSOLVED kg | AN-102 DECANT kg | AN-102 SOLIDS kg | CRYST'ZER STEAM kg | CRYST'ZER LIQUOR kg | CRYST'ZER PRODUCT kg |
|---|---|---|---|---|---|---|---|---|---|
| $H_2O$ | 2,877,100 | 2,879,200 | 411,490 | 3,290,400 | 3,290,400 | | 317,580 | 2,972,900 | |
| Aqueous Species: | | | | | | | | | |
| $Na_2SO_4$ | 105,398 | 105,391 | | 105,396 | 105,323 | | | 71,970 | |
| $Na_2CO_3$ | 524,682 | 524,640 | | 524,632 | 524,604 | | | 512,154 | |
| $NaNO_3$ | 1,301,300 | 1,301,300 | | 1,301,300 | 1,301,300 | | | 1,301,300 | |
| $NaNO_2$ | 549,050 | 549,040 | | 549,030 | 549,030 | | | 549,000 | |
| $Na_7F(PO_4)_2 \cdot 19H_2O$ | 65,637 | 68,742 | | 68,796 | 68,796 | | | 68,682 | |
| $Na(C_2H_3O_2)$ | 50,885 | 50,853 | | 50,864 | 50,864 | | | 50,852 | |
| NaCOOH | 42,021 | 41,990 | | 42,000 | 42,000 | | | 41,989 | |
| NaOH | 38,563 | 35,517 | | 36,098 | 36,098 | | | 36,222 | |
| $Na(C_2H_3O_3)$ | 36,356 | 36,330 | | 36,341 | 36,341 | | | 36,330 | |
| $H_3C_6H_5O_7$ | 28,404 | 28,404 | | 28,404 | 28,404 | | | 28,404 | |
| NaCl | 27,271 | 27,266 | | 27,269 | 27,269 | | | 27,266 | |
| $(NaAlO_2)_2 \cdot 2.5(H_2O)$ | 21,829 | 31,209 | | 29,457 | 29,457 | | | 29,389 | |
| NaF | 12,301 | 12,118 | | 12,115 | 12,115 | | | 12,121 | |

TABLE 2-continued

| AN-102 BURKEITE CRYSTALLIZATION | AN-102 INVEN-TORY kg | AN-102 HEATED kg | H2O kg | AN-102 DIS-SOLVED kg | AN-102 DECANT kg | AN-102 SOLIDS kg | CRYST'ZER STEAM kg | CRYST'ZER LIQUOR kg | CRYST'ZER PRODUCT kg |
|---|---|---|---|---|---|---|---|---|---|
| $H_4C_{10}H_{12}N_2O_8$ | 12,959 | 12,959 | | 12,959 | 12,959 | | | 12,959 | |
| $K_2O$ | 12,500 | 12,285 | | 12,374 | 12,374 | | | 12,321 | |
| $Na_2Cr_{VI}O_4$ | 5,561 | 5,561 | | 5,561 | 5,561 | | | 5,561 | |
| $Na_3PO_4 \cdot 12H_2O \cdot \frac{1}{4}NaOH$ | 4,180 | | | | | | | | |
| $Ni(OH)_2$ | 2,782 | 2,782 | | 2,782 | 2,782 | | | 2,782 | |
| $NaHSiO_3$ | 891 | 554 | | 700 | 700 | | | 634 | |
| $NaC_6H_{11}O_7$ | 857 | 857 | | 857 | 857 | | | 857 | |
| $Ca(OH)_2$ | 501 | 255 | | 274 | 274 | | | 234 | |
| $CaO \cdot Fe_2O_3$ | 424 | 424 | | 424 | 424 | | | 424 | |
| $K(HCOO)$ | 263 | 301 | | 288 | 288 | | | 302 | |
| $K(C_2H_3O_2)$ | 208 | 246 | | 233 | 233 | | | 247 | |
| $K(C_2H_3O_3)$ | 193 | 222 | | 210 | 210 | | | 223 | |
| $CsNO_3$ | 105 | 106 | | 106 | 106 | | | 106 | |
| $NaTc_{VII}O_4$ | 65 | 65 | | 65 | 65 | | | 65 | |
| $Sr(OH)_2$ | 33 | 39 | | 39 | 39 | | | 39 | |
| $KCl$ | 13 | 20 | | 16 | 16 | | | 20 | |
| $Mn(OH)_2$ | 8 | 31 | | 41 | 41 | | | 34 | |
| $NaHCO_3$ | 7 | 49 | | 58 | 58 | | | 59 | |
| $Na_2UO_4$ | 0 | 1 | | 2 | 2 | | | 1 | |
| Solid Species: | | | | | | | | | |
| $Al(OH)_3$ | 164,910 | 157,640 | | 159,060 | 0 | 159,060 | | 0 | |
| $Na_2C_2O_4$ | 61,452 | 61,452 | | 61,452 | 3,506 | 57,946 | | 2,769 | 737 |
| $Ca_5(OH)(PO_4)_3$ | 6,291 | 6,625 | | 6,600 | | 6,600 | | | 53 |
| $KAlSiO_4$ | 3,074 | 3,608 | | 3,377 | | 3,377 | | | 104 |
| $Fe_{III}O(OH)$ | 1,278 | 1,278 | | 1,278 | | 1,278 | | | |
| $Na_2U_2O_7$ | 1,214 | 1,214 | | 1,213 | | 1,213 | | | 0 |
| $Pb(OH)_2$ | 832 | 832 | | 832 | 3 | 829 | | 2 | 0 |
| $MnO_2$ | 554 | 531 | | 521 | | 521 | | | 7 |
| $ZrO_2$ | 442 | 442 | | 442 | | 442 | | | |
| $Bi_2O_3$ | 342 | 341 | | 341 | 10 | 331 | | 10 | |
| $LaPO_4 \cdot 2H_2O$ | 39 | 39 | | 39 | | 39 | | | |
| $SrCO3$ | 15 | 7 | | 8 | | 8 | | | |
| $Pu_{IV}(OH)_4$ | 1 | 1 | | 1 | 0 | 1 | | 0 | 0 |
| $Na_6(SO_4)_2CO_3$ | | | | | | 100 | | | 45,800 |
| Total kg/hr | 5,962,790 | 5,962,766 | 411,490 | 6,374,252 | 6,142,508 | 231,745 | 317,580 | 5,778,228 | 46,702 |
| $Na_2SO_4/Na_2CO_3$ | 0.20 | 0.20 | | 0.20 | 0.20 | | | 0.14 | |
| $Na+/SO4-$ | 0.019 | 0.019 | | 0.019 | 0.019 | | | 0.013 | |

TABLE 3

Experiment 5 -
Summary of Experimental Conditions, Solutions A–E
AZ-102 BURKEITE CRYSTALLIZATION LAB TEST 1 atm

| | | | INITIAL | CRYSTALLIZE | | |
|---|---|---|---|---|---|---|
| | | | | Stream | | |
| | | | AZ-102G | AZ-102EV | AZ-102EV | AZ-102EV |
| | | | | | Phase | |
| | | | Aqueous | Aqueous | Solid | Vapor |
| | | | | Temperature, C. | | |
| | | | 50 | 113.0 | 113.0 | 113.0 |
| | | | | Pressure, atm | | |
| | | | 1 | 1 | | 1 |
| | | | | pH | | |
| | | | 13.65 | 12.83 | | |
| | | | | Flow Units | | |
| SOLUTION | | MW | gm | gm | gm | gm |
| A, B, C, D, E | Water | $H_2O$ | 18.02 | 835.50 | 375.40 | — | 460.10 |
| A, B, C, D, E | Sodium Carbonate | $Na_2CO_3$ | 105.99 | 54.40 | 46.56 | — | — |
| A, B, C, D, E | Sodium Sulfate | $Na_2SO_4$ | 142.02 | 23.34 | 2.34 | — | — |
| B, C, D, E | Sodium Nitrite | $NaNO_2$ | 69.00 | 44.47 | 44.46 | — | — |

TABLE 3-continued

Experiment 5 -
Summary of Experimental Conditions, Solutions A–E
AZ-102 BURKEITE CRYSTALLIZATION LAB TEST 1 atm

| | | | | | | | |
|---|---|---|---|---|---|---|---|
| B, C, D, E | Sodium Nitrate | NaNO3 | 85.00 | 21.87 | 21.87 | — | — |
| C, D, E | Sodium Hydroxide | NaOH | 40.00 | 77.68 | 77.68 | — | — |
| C, D, E | Aluminum Hydroxide | Al(OH)3 | 78.00 | 21.40 | 21.40 | — | — |
| D, E | Sodium Fluoride | NaF | 41.99 | 2.14 | 2.14 | — | — |
| E | Sodium Oxalate | Na2C2O4 | 134.00 | 4.93 | 0.36 | 4.57 | — |
| | Burkeite | Na6(SO4)2CO3 | 390.08 | — | — | 28.83 | — |
| | Total g/hr | | | 1,085.71 | 592.21 | 33.40 | 460.10 |
| | Volume, L | | | 0.92 | 0.46 | | 1,097.55 |
| | Density, g/L | | | 1,185 | 1,282 | | |

TABLE 4

Summary of Results

| Solution | List of components | Amount of condensate collected (mL) | Weight of crystals collected (g) | XRD Phase patterns observed |
|---|---|---|---|---|
| A | Na$_2$CO$_3$ and Na$_2$SO$_4$ | 517 | 8.6 | Na$_6$CO$_3$(SO$_4$)$_2$, Na$_4$CO$_3$SO$_4$, and Na$_2$CO$_3$ |
| B | Na$_2$CO$_3$, Na$_2$SO$_4$, NaNO$_2$, and NaNO$_3$ | 464.2 | 24.9 | Na$_6$CO$_3$(SO$_4$)$_2$, Na$_4$CO$_3$SO$_4$, and Na$_2$CO$_3$ |
| C | Na$_2$CO$_3$, Na$_2$SO$_4$, NaNO$_2$, NaNO$_3$, NaOH, and Al(OH)$_3$ | 345 | 38.6 | Na$_6$CO$_3$(SO$_4$)$_2$, Na$_4$CO$_3$SO$_4$, and Na$_2$CO$_3$ |
| D | Na$_2$CO$_3$, Na$_2$SO$_4$, NaNO$_2$, NaNO$_3$, NaOH, Al(OH)$_3$, and NaF | 460.3 | 44.5 | Na$_6$CO$_3$(SO$_4$)$_2$ and Na$_2$CO$_3$ |
| E | Na$_2$CO$_3$, Na$_2$SO$_4$, NaNO$_2$, NaNO$_3$, NaOH, Al(OH)$_3$, NaF, and Na$_2$C$_2$O$_4$ | 460 | 49.6 | Na$_6$CO$_3$(SO$_4$)$_2$, Na$_2$CO$_3$ and Na$_2$C$_2$O$_4$ |

What is claimed is:

1. A process for removing burkeite from an aqueous salt solution comprising aluminum, sodium and sulfate ions, comprising:
   adding at least one of alkali and water to the salt solution in an amount sufficient to solubilize alkali-soluble compounds present in the salt solution;
   optionally filtering the salt solution to remove any undissolved solids and to produce a solution essentially free of solids;
   removing excess water from the salt solution to produce a saturated solution;
   precipitating burkeite from the saturated solution; and
   separating the precipitated burkeite from the saturated solution such that the saturated solution has a sulfate to sodium mole ratio (SO$_4^{-2}$/Na$^+$ of less than about 0.01.

2. The process according to claim 1, further comprising heating the salt solution during the removal of excess water step.

3. The process according to claim 2, wherein the salt solution is heated to between about 50° C. and about 150° C.

4. The process according to claim 1, wherein the pressure of the salt solution is reduced during the removal of excess water step.

5. The process according to claim 4, wherein the pressure is reduced to between about 0.1 atmosphere to less than about 1 atmosphere.

6. The process according to claim 1, wherein the salt solution further comprises barium ions, cesium ions, iron ions, manganese ions, nickel ions, strontium ions, technetium ions, plutonium ions, potassium ions, uranium ions, zirconium ions, carbonate ions, fluoride ions, chromate ions, nitrite ions, nitrate ions, silicate ions, phosphate ions, calcium ions or combinations thereof.

7. The process according to claim 1, wherein the removal of excess water step further comprises crystallizing and removing carbonate, sulfate and fluoride salts of sodium.

8. The process according to claim 7, wherein the carbonate salts of sodium comprise anhydrate, monohydrate, heptahydrate and decahydrate salts.

9. The process according to claim 7, wherein said sulfate salts of sodium comprise sesquiburkeite and anhydrous sodium sulfate.

10. The process according to claim 7, wherein the fluoride salts of sodium comprise sodium fluoride and trisodium fluoride sulfate.

11. The process according to claim 1, further comprising at least one of the following, prior to the removal of excess water step:
   oxidizing any organic compounds present in the salt solution;
   precipitating any strontium-containing compounds present in the salt solution; and
   removing any radionuclides present in the salt solution.

* * * * *